United States Patent
Katoh

(10) Patent No.: US 11,161,740 B2
(45) Date of Patent: *Nov. 2, 2021

(54) METHOD OF SYNTHESIS OF $LiTi_2(PS_4)_3$

(71) Applicant: TOYOTA MOTOR EUROPE, Brussels (BE)

(72) Inventor: Yuki Katoh, Brussels (BE)

(73) Assignee: TOYOTA MOTOR EUROPE, Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 16/325,234

(22) PCT Filed: Sep. 5, 2016

(86) PCT No.: PCT/EP2016/070867
§ 371 (c)(1),
(2) Date: Feb. 13, 2019

(87) PCT Pub. No.: WO2018/041374
PCT Pub. Date: Mar. 8, 2018

(65) Prior Publication Data
US 2019/0177163 A1    Jun. 13, 2019

(51) Int. Cl.
*C01B 25/14*    (2006.01)
*H01M 10/052*   (2010.01)
(Continued)

(52) U.S. Cl.
CPC ........... *C01B 25/14* (2013.01); *H01M 10/052* (2013.01); *H01M 10/0562* (2013.01); *H01M 2300/0068* (2013.01)

(58) Field of Classification Search
CPC .. C01B 25/14; H01M 10/052; H01M 10/0562
See application file for complete search history.

(56) References Cited

U.S. PATENT DOCUMENTS 8,697,292 B2 * 4/2014 Kanno .................... C01B 17/20
429/304
2013/0040208 A1 * 2/2013 Kanno ................. C01G 17/006
429/319
(Continued)

FOREIGN PATENT DOCUMENTS

CN    103401017     *   8/2013
CN    103401017 A      11/2013
(Continued)

OTHER PUBLICATIONS

Kim et al Chem Mater 2008 20 47-474 (Year: 2008).*
(Continued)

*Primary Examiner* — Sheng H Davis
(74) *Attorney, Agent, or Firm* — Oliff PLC

(57) ABSTRACT

A method of synthesis of lithium titanium thiophosphate $LiTi_2(PS_4)_3$ including the steps of: (a) providing a mixture of lithium sulfide $Li_2S$, phosphorus sulfide $P_2S_5$ and titanium sulfide $TiS_2$; (b) subjecting the mixture prepared in step (a) to a preliminary reaction step through mechanical milling or melt-quenching to produce an intermediate amorphous sulfide mixture; (c) subjecting the mixture prepared in step (b) to a heat treatment step at a maximum plateau temperature of at least 350° C. and less than 500° C.

6 Claims, 3 Drawing Sheets

(a).

(b).

(51) Int. Cl.
*H01M 10/0562* (2010.01)
*C01B 25/00* (2006.01)

(56) References Cited

U.S. PATENT DOCUMENTS

| | | | | |
|---|---|---|---|---|
| 2014/0148328 | A1* | 5/2014 | Castillo | A61C 5/77 501/2 |
| 2014/0370398 | A1* | 12/2014 | Lee | H01M 4/5815 429/322 |
| 2015/0280276 | A1 | 10/2015 | Lemke et al. | |
| 2016/0149215 | A1 | 5/2016 | Shim et al. | |
| 2016/0156021 | A1* | 6/2016 | Aihara | H01M 10/0525 429/304 |
| 2016/0233539 | A1 | 8/2016 | Sastry et al. | |
| 2016/0372785 | A1* | 12/2016 | Jang | H01M 10/0562 |
| 2017/0117551 | A1 | 4/2017 | Choi et al. | |
| 2017/0170477 | A1* | 6/2017 | Sakshaug | C04B 41/5096 |
| 2017/0229734 | A1* | 8/2017 | Furukawa | H01M 10/0525 |

FOREIGN PATENT DOCUMENTS

| | | | | |
|---|---|---|---|---|
| DE | 10 2011 121681 | A1 | 6/2013 | |
| DE | 102011121681 | A1 * | 6/2013 | H01M 10/052 |
| EP | 1466865 | A1 * | 10/2004 | C03C 3/321 |
| EP | 2 555 307 | A1 | 2/2013 | |
| JP | 2000-109360 | A | 4/2000 | |
| JP | 2002-284530 | A | 10/2002 | |
| WO | 2011/118801 | A1 | 9/2011 | |
| WO | 2014/148432 | A1 | 9/2014 | |

OTHER PUBLICATIONS

Micro&Nano Technical Bulletin (Year: 2009).*
Machine translation of CN 103401017 (Year: 2013).*
Definition for "Plateau". Merriam-Webster. (Year: 2020).*
Kim et al., "3D Framework Structure of a New Lithium Thiophosphate, LiTi2(PS4)3, as Lithium Insertion Hosts," Chem. Mater., 2008, vol. 20, pp. 470-474.
Kim et al., "Lithium Intercalation into ATi2(PS4)3 (A= Li, Na, Ag)," Electrochemistry Communications, 2008, vol. 10, pp. 497-501.
Shin et al., "All-Solid-State Rechargeable Lithium Batteries Using LiTi2(PS4)3 Cathode with Li2S-P2S5 Solid Electrolyte," Journal of the Electrochemical Society, 2014, vol. 161, No. 1, A154-A159.
Nov. 18, 2016 International Search Report issued in International Patent Application No. PCT/EP2016/070867.
Yi et al. "Spinel Li4Ti5-xZrxO12 (0£x£0.25) materials as high-performance anode materials for lithium-ion batteries." Journal of Alloys and Compounds, Jan. 16, 2013, vol. 558, pp. 11-17.
Jul. 11, 2017 International Search Report issued in International Patent Application No. PCT/EP2016/076153.
Rao et al. "Influence of Zr4+ doping on structural, spectroscopic and conductivity studies of lithium titanium phosphate." Ceramics International, Jun. 2, 2014, vol. 40, No. 9, pp. 13911-13916.
Seino et al. "A sulphide lithium super ion conductor is superior to liquid ion conductors for use in rechargeable batteries." Energy & Environmental Science, 2014, vol. 7, pp. 627-631.
Nov. 18, 2016 International Search Report issued in International Patent Application No. PCT/EP2016/070869.
Nov. 18, 2016 Written Opinion issued in International Patent Application No. PCT/EP2016/070869.
Arbi et al., "Structural Factors That Enhance Lithium Mobility in Fast-Ion Li1+xTi2-xAlx(PO4)3 (0£x£0.4) Conductors Investigated by Neutron Diffraction in the Temperature Range 100-500 K," Inorganic Chemistry, 2013, vol. 52, pp. 9290-9296.
Wang et al., "Identifying Li+ ion transport properties of aluminum doped lithium titanium phosphate solid electrolyte at wide temperature range," Solid State Ionics, 2014, vol. 268, pp. 110-116.
Jul. 7, 2017 International Search Report issued in International Patent Application No. PCT/EP2016/076151.
U.S. Appl. No. 16/314,266, filed Dec. 28, 2018 in the name of Katoh et al.
U.S. Appl. No. 16/326,480, filed Feb. 19, 2019 in the name of Katoh.
U.S. Appl. No. 16/326,117, filed Feb. 15, 2019 in the name of Katoh.
Aug. 21, 2020 Notice of Allowance Issued in U.S. Appl. No. 16/326,117.
Nov. 2, 2020 Office Action issued in U.S. Appl. No. 16/314,266.
Mar. 10, 2020 Office Action issued in Japanese Patent Application No. 2019-512618.
Feb. 18, 2018, Office Action issued in Japanese Patent Application No. 2019-512619.
Jan. 19, 2021 Office Action issued in U.S. Appl. No. 16/326,480.
Apr. 27, 2021 Notice of Allowance Issued in U.S. Appl. No. 16/314,266.
Apr. 30, 2021 Notice of Allowance issued in U.S. Appl. No. 16/326,480.

* cited by examiner

METHOD OF SYNTHESIS OF LiTi$_2$(PS$_4$)$_3$

FIELD OF THE INVENTION

The present invention relates to a method of synthesis of lithium titanium thiophosphate LiTi$_2$(PS$_4$)$_3$.

BACKGROUND ART

The all-solid-state battery system offers the possibility of high energy density of the battery pack. In order to realize such systems, a solid electrolyte which exhibits high ionic conductivity is demanded. LiTi$_2$(PS$_4$)$_3$ is a candidate for such a solid electrolyte, and has been described in Kim et al., *Chem. Mater.* 2008, 20, 470-474; Kim et al., *Electrochemistry Communications* 10 (2008) 497-501; and Shin et al., *Journal of The Electrochemical Society*, 161 (1) A154-A159 (2014).

According to the method of synthesis described in Kim et al., *Chem. Mater.* 2008, 20, 470-474, a stoichiometric mixture of Li$_2$S, TiS$_2$ and P$_2$S$_5$ is mixed and heated under vacuum according to the following temperature profile:

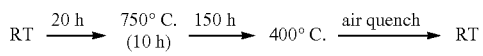

However, the synthesis conditions proposed in the literature were not optimized with respect to the generation of secondary phases and ionic conductivity.

SUMMARY OF THE INVENTION

With a view to solving the above-referenced problems in the synthesis of lithium titanium thiophosphate LiTi$_2$(PS$_4$)$_3$, the present inventor has studied different aspects of the preparation of this material, and this work has led to the achievement of the present invention.

In one aspect, the present invention thus relates to a method of synthesis of lithium titanium thiophosphate LiTi$_2$(PS$_4$)$_3$ comprising the steps of:

(a) providing a mixture of lithium sulfide Li$_2$S, phosphorus sulfide P$_2$S$_5$ and titanium sulfide TiS$_2$;

(b) subjecting the mixture prepared in step (a) to a preliminary reaction step through mechanical milling or melt-quenching to produce an intermediate amorphous sulfide mixture;

(c) subjecting the mixture prepared in step (b) to a heat treatment step at a maximum plateau temperature of at least 350° C. and less than 500° C.

Here "maximum plateau temperature" refers to the maximum temperature maintained in a heating vessel as commonly used in solid state chemistry, the temperature vs. time profile typically including a gradual ascent phase with a controlled rate of increase of temperature starting from room temperature, a chosen reaction temperature maintained effectively constant over a period of time (the "maximum plateau temperature"), and then a descent phase wherein the temperature is brought back down to room temperature.

DETAILED DESCRIPTION OF THE INVENTION

Figure 1:
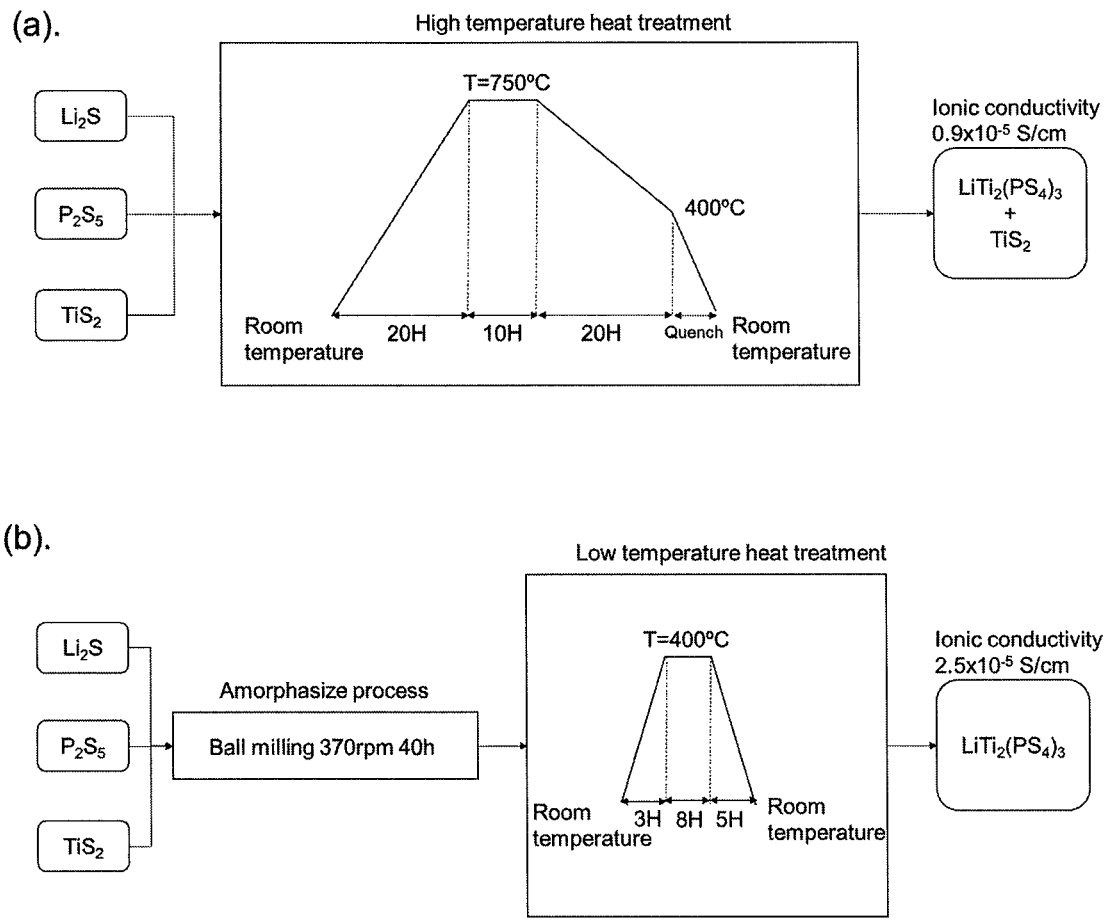
FIG. 1*a* shows a schematic view of a high temperature heat treatment process according to a prior art method, with a temperature incline prior to heat treatment, a maximum plateau temperature maintained at 700° C. during heat treatment and then a programmed temperature decrease.
FIG. 1*b* shows an illustrative and non-limiting embodiment of a process according to the present invention with a first amorphasizing step, followed by low-temperature heat treatment, with a preferred maximum plateau temperature T maintained during heat treatment at 375° C.≤T≤450° C.

Without wishing to be bound by any particular theory, it is believed that the low ionic conductivity of LiTi$_2$(PS$_4$)$_3$ obtained according to literature methods may be due to the impurity of TiS$_2$ included in the synthesized material. Because of the incongruent melting behavior of LiTi$_2$(PS$_4$)$_3$, it is important to avoid melting of the material during heat treatment. By "incongruent melting", reference is made here to chemical transformation of the material upon melting, with new chemical bonds being formed. Without control of undesired melting and impurity formation, it is very difficult to obtain a single phase of LiTi$_2$(PS$_4$)$_3$. To solve the above-mentioned problems, the present invention provides a new synthesis procedure of LiTi$_2$(PS$_4$)$_3$.

In the present invention, an intermediate step is proposed, before the high-temperature reaction to produce final LiTi$_2$(PS$_4$)$_3$ product, the intermediate step consisting of subjecting the mixture prepared in step (a), based on ordinary solid samples of each of the three reaction components (as may be obtained from commercial suppliers) to a preliminary reaction step through mechanical milling or melt-quenching to produce an intermediate amorphous sulfide mixture. This intermediate step may also be referred to hereinafter as an "amorphasizing step", and provides amorphous materials derived from Li$_2$S—TiS$_2$—P$_2$S$_5$. This amorphous material is able to be heat-treated at over 400° C. without melting. Without the intermediate step, the specimens are melted due to the low melting point of P$_2$S$_5$ (~270° C.). Elemental phosphorus and sulfur also have lower melting points and will thus melt before the temperatures needed to produce LiTi$_2$(PS$_4$)$_3$ product in the solid phase reaction. It is considered that the most important effect of the intermediate step is allowing Li$_2$S, TiS$_2$ and P$_2$S$_5$ to completely mix and react with each other—the intermediate step may, as well as ensuring intimate physical mixing, begin the chemical transformations which will lead to the final product. The intermediate step may thus act to react the low melting material of P$_2$S$_5$ with Li$_2$S (or at least start this reaction).

In terms of starting material mole ratios, the method is appropriately carried out with as close as possible to a stoichiometric ratio thereof in view of the final product LiTi$_2$(PS$_4$)$_3$ product to be produced. Thus, the lithium sulfide Li$_2$S, phosphorus sulfide P$_2$S$_5$ and titanium sulfide TiS$_2$ starting materials are generally used in a Li$_2$S:P$_2$S$_5$:TiS$_2$ mole ratio of 1:3:4.

The amorphous material obtained through the "amorphasizing step" can advantageously be heat-treated at the temperature of 350° C.≤T<500° C. More generally, in heat treatment step (c), the maximum plateau temperature is appropriately not more than 475° C., and preferably at least 375° C., more preferably at least 400° C. and at most 450° C. Further, in heat treatment step (c), the maximum plateau temperature during heat treatment is appropriately maintained for at least 1 hour and at most 300 hours. In terms of the speed of temperature increase going from room temperature up to the maximum plateau temperature, before the heat treatment step, a generally appropriate range is from 0.1° C. min$^{-1}$ to 20° C. min$^{-1}$. A preferred speed is in the range of 1° C. min$^{-1}$ to 5° C. min$^{-1}$. Analogous rates of temperature decrease after the heat treatment step, may also be used to bring the sample back down to room temperature.

When LiTi$_2$(PS$_4$)$_3$ is produced by using the method of the present invention, it can be obtained substantially as a single phase without any impurity of TiS$_2$. Values of about three times higher ionic conductivity can be observed as compared to that of LiTi$_2$(PS$_4$)$_3$ produced by a conventional process.

In the method according to the present invention, each of the method steps (a), (b) and (c) is advantageously carried out under an inert gas, for example, nitrogen or argon, preferably argon.

As mentioned above, in one way of carrying out the present invention, the intermediate step (b), also referred to herein as an "amorphasizing step", the intermediate step giving rise to an intermediate amorphous sulfide mixture, may be a carried out by a "melt-quenching" procedure. In an appropriate melt-quenching step, the starting materials are heated to a temperature higher than the melting point of the final product LiTi$_2$(PS$_4$)$_3$, i.e. to over 700° C. A quick heating procedure may be used to avoid evaporation when attaining the high temperature of over 700° C. However, in most cases, it is preferable for a sample to be in the equilibrium state before quenching. Therefore, it is appropriate to wait for a relatively longer period and heat up more slowly, for example with a heating rate of 0.05° C. min$^{-1}$ to 20° C. min$^{-1}$, with a holding time of appropriately 3 hours to 300 hours. To quench the molten mixture, raised to a temperature above 700° C., a rapid cooling rate is used, appropriately between 300 to 1,000 K s$^{-1}$, to bring the mixture to room temperature or below. A generally appropriate method for sulfide amorphous materials is ice quenching. In such a method, a heated quartz tube containing the material to be quenched is placed in ice water.

In preferred embodiments for carrying out the present invention, the intermediate step (b), also referred to herein as an "amorphasizing step", the intermediate step giving rise to an intermediate amorphous sulfide mixture, is carried out by a mechanical milling procedure, such as planetary ball milling, vibration milling or jet milling. Where the preferred method of planetary ball milling is used, a generally appropriate ball size range is chosen within the range 1 mm≤ϕ≤10 mm, the temperature range is chosen within the range 0° C.≤T≤60° C., the rotation speed is chosen within the range 200 rpm≤R≤500 rpm, and the duration is chosen within the range 5≤t≤200 h.

In a further aspect, the present disclosure relates to an all-solid-state lithium battery comprising the following elements:
 a positive electrode active material layer;
 a solid electrolyte layer;
 a negative electrode active material layer,
wherein the solid electrolyte layer contains a lithium titanium thiophosphate LiTi$_2$(PS$_4$)$_3$ material produced according to the present invention, and is positioned between the positive electrode active material layer and negative electrode active material layer.

In such an all-solid-state lithium battery, using as solid electrolyte, the LiTi$_2$(PS$_4$)$_3$ sulfide materials produced according to the present invention, concerning the form of the solid electrolyte materials, examples include a particle shape, such as the shape of a true ball and the shape of an elliptical ball, or a thin film form, for example. When solid electrolyte materials have a particle shape, as for the mean particle diameter, it is preferable that their size is within the range of 50 nm to 10 micrometers, more preferably within the range of 100 nm to 5 micrometers.

Although it is preferable to have only one or more solid electrolyte materials as mentioned above in a solid electrolyte layer, this layer may also contain a binding agent if needed. As a binding agent used for a solid electrolyte layer, this may be of the same type as mentioned hereunder for the positive active material layer.

As regards the thickness of a solid electrolyte layer, although this may change with the kind of solid electrolyte materials, and the overall composition of an all-solid battery, generally it is preferable that this thickness is within the range of 0.1 micrometer to 1,000 micrometers, more preferably within the range of 0.1 micrometer to 300 micrometers.

Concerning the positive active material (cathode active material) to be used in the positive electrode (cathode) active material layer, this is not especially limited if the average operating potential becomes more than 4 V (vs. Li/Li$^+$). As an average operating potential of positive active material, this is appropriately more than 4 V (vs. Li/Li$^+$), and it is preferable that it is within the limits of 4.0 V to 6.0 V, still more preferably within the limits of 4.5 V to 5.5 V. The average operating potential can be evaluated using cyclic voltammetry, for example. In particular, when cyclic voltammetry is measured at a small electric potential speed like 0.1 mV/sec, it can be considered that the average value of the voltage which gives the peak current on the side of oxidation, and the voltage which gives the peak current on the side of reduction is the average operating potential.

As a positive active material, especially if the average operating potential is made with more than 4 V (vs. Li/Li$^+$), there is no specific limitation, but it is preferable that the material is an oxide positive active material, which can have a high energy density.

A compound which has the spinel type structure denoted by general formula LiM$_2$O$_4$ (M is at least one kind of transition metal element), as an example of positive active material, can be mentioned as an example. As regards M of the above-mentioned general formula LiM$_2$O$_4$, especially if it is a transition metal element, it will not be limited, but it is preferable that it is at least one kind chosen from the group which consists of Ni, Mn, Cr, Co, V, and Ti, for example, and it is more preferable that it is at least one kind chosen from the group which consists of Ni, Mn, and Cr especially. Specifically, LiCr$_{0.05}$Ni$_{0.50}$Mn$_{1.45}$O$_4$, LiCrMnO$_4$, LiNi$_{0.5}$Mn$_{1.5}$O$_4$, etc. can be mentioned. The compound which has the olivine type structure denoted by general formula LiMPO$_4$ (M is at least one kind of transition metal element) as other examples of positive active material can be mentioned. M in the above-mentioned general formula will not be limited especially if it is a transition metal element, but it is preferable that it is at least one kind chosen from Mn, Co, Ni, and the group that consists of V, for example, and it is more preferable that it is at least one kind chosen from the group which consists of Mn, Co, and Ni especially. Specifically, LiMnPO$_4$, LiCoPO$_4$, LiNiPO$_4$, etc. can be mentioned. The compound which has the layer structure denoted by general formula LiMO$_2$ (M is at least 1 type of a transition metal element) as other examples of positive active material can be mentioned. Specifically, LiCoO$_2$, LiNi$_{0.5}$Mn$_{0.5}$O$_2$ and LiNi$_{0.33}$Co$_{0.33}$Mn$_{0.33}$O$_2$ etc. can be mentioned. As examples other than the positive active material mentioned above, a Li$_2$MnO$_3$—LiNi$_{1/3}$Co$_{1/3}$Mn$_{1/3}$O$_2$ solid solution, a Li$_2$MnO$_3$—LiNi$_{0.5}$Mn$_{1.5}$O$_2$ solid solution, a Li$_2$MnO$_3$—LiFeO$_2$ solid solution, etc. can be mentioned.

As regards the form of the positive active material, a particle shape, such as the shape of a true ball and the shape of an elliptical ball, thin film form, etc. can be mentioned, as an example. As for the mean particle diameter, when the positive active material has a particle shape, it is preferable that it is within the size range of 0.1 micrometer to 50 micrometers, for example. As for the content of the positive active material in a positive active material layer, it is preferable that it is in the range of 10% by weight to 99% by weight, for example, more preferably from 20% by weight to 90% by weight.

Concerning the positive active material layer, in addition to the positive active material mentioned above, if needed, the positive active material layer in may contain other materials, for example, solid electrolyte materials etc. As for the content of the solid electrolyte materials in a positive active material layer, it is preferable that this content is 1% by weight to 90% by weight, more preferably 10% by weight to 80% by weight.

Furthermore, a positive active material layer may contain an electrically conductive agent from a viewpoint of improving the conductivity of a positive active material layer, other than the solid electrolyte materials mentioned above. As electrically conductive material, acetylene black, Ketjen-black, a carbon fiber, etc. can be mentioned, for example. A positive active material may also contain a binding agent. As such a binding material (binding agent), fluorine-based binding materials, such as polyvinylidene fluoride (PVDF) and polytetrafluoroethylene (PTFE), etc. can be mentioned, for example.

Although the thickness of a positive active material layer may change according to the kind of all-solid-state battery made, it is generally preferable that it is within the range of 0.1 micrometer to 1,000 micrometers.

As regards the negative electrode active material layer, this layer at least contains one or more negative electrode active material(s), and may additionally contain at least one or more of solid electrolyte materials and electrically conductive agents if needed. For all-solid-state lithium batteries, the negative electrode active material is not limited provided that occlusion and discharge of the Li ion, which is a conduction ion, are possible. As a negative electrode active material, a carbon active material, a metal active material, etc. can be mentioned, for example. As a carbon active material, black lead, meso carbon micro beads (MCMB), highly ordered/oriented pyrolytic graphite (HOPG), hard carbon, soft carbon, etc. can be mentioned as examples. On the other hand, as a metal active material, charges of an alloy, such as Li alloy and Sn—Co—C, In, Al, Si, Sn, etc. can be mentioned as examples. Oxide stock materials, such as Li$_4$Ti$_5$O$_{12}$, can be mentioned as examples of other negative electrode active materials.

Concerning solid electrolyte materials used for the negative electrode active material layer, and an electrically conductive agent, these may be the same as that for the solid electrolyte layer and positive active material layer mentioned above.

The thickness of the negative electrode active material layer will generally be appropriately within the range of 0.1 micrometer to 1,000 micrometers.

An all-solid-state battery of the present disclosure has at least the positive active material layer, solid electrolyte layer, and negative electrode active material layer which were mentioned above. It further usually has a positive pole collector which collects a positive active material layer, and a negative pole collector which performs current collection of a negative electrode active material layer. As a material of a positive pole collector, for example, SUS (stainless steel), aluminum, nickel, iron, titanium, carbon, etc. can be mentioned, and SUS is especially preferable. On the other hand as a material of a negative pole collector, SUS, copper, nickel, carbon, etc. can be mentioned, for example, and SUS is especially preferable. Concerning the thickness, form, etc. of a positive pole collector and a negative pole collector, the person skilled in the art may choose suitably according to the use of the all-solid-state battery, etc. The cell case used for a common all-solid-state battery can be used, for example, the cell case made from SUS, etc. can be mentioned. The all-solid-state battery may form a power generation element in the inside of an insulating ring.

The all-solid-state battery of the present disclosure can be considered as a chargeable and dischargeable all-solid-state battery in a room temperature environment. Although it may be a primary battery and may be a rechargeable battery, it is especially preferable that it is a rechargeable battery. Concerning the form of the all-solid-state battery, a coin type, a laminated type, cylindrical, a square shape, etc. can be mentioned, as examples.

As regards the manufacturing method of the all-solid-state battery, this is not particularly limited, and common manufacturing methods of all-solid-state batteries can be used. For example, when an all-solid-state battery is in the thin film form, a positive active material layer can be formed on a substrate, and the method of forming a solid electrolyte layer and a negative electrode active material layer in order, and laminating them thereafter etc., may be used.

Within the practice of the present invention, it may be envisaged to combine any features or embodiments which have hereinabove been separately set out and indicated to be advantageous, preferable, appropriate or otherwise generally applicable in the practice of the invention. The present description should be considered to include all such combinations of features or embodiments described herein unless such combinations are said herein to be mutually exclusive or are clearly understood in context to be mutually exclusive.

EXPERIMENTAL SECTION—EXAMPLES

The following experimental section illustrates experimentally the practice of the present invention, but the scope of the invention is not to be considered to be limited to the specific examples that follow.

Example 1

Synthesis of Solid Electrolytes

Mixture Step

The solid electrolyte $LiTi_2(PS_4)_3$ was synthesized using starting materials $Li_2S$ (Sigma), $TiS_2$ (Sigma), and $P_2S_5$ (Aldrich). They were mixed at the weight ratio listed in Table 1 below:

TABLE 1

Weight ratio of starting materials for $LiTi_2(PS_4)_3$ synthesis

| | Weight of starting material (g) | mmol of starting material |
|---|---|---|
| $Li_2S$ | 0.039584 | 0.8615 |
| $P_2S_5$ | 0.57447 | 2.5845 |
| $TiS_2$ | 0.385946 | 3.4460 |

Amorphasizing Step

The mixed sample was put into a zirconium pot (45 mL) with 18 zirconium balls (ϕ 10 mm) under argon. The pot was closed and treated with planetary milling equipment (Fritsch, P7) at 370 rpm for 40 h to obtain the precursor.

Heat Treatment Step

The precursor was sealed into a glass tube at a pressure of 30 Pa and then heated at T=375° C. for 8 h. A temperature incline of 2.2° C. $min^{-1}$ was used to bring the sample up to this heat treatment temperature.

At the heat treatment temperature of 375° C., the sample was not melted.

The procedure is shown in FIG. 1 as well as the literature process.

Measurement of Li Ion Conductance

Li ion conductance at a temperature of 25° C. was measured using the sulfide solid electrolyte material obtained. First, 100 mg of the sulfide solid electrolyte material was added to a cylinder made of alumina and pressed at 4 ton/$cm^2$ to form a solid electrolyte layer. The pellet was sandwiched by SUS current collector for measuring impedance spectroscopy.

An impedance gain-phase analyzer manufactured by Biologic (VMP3) was used for the measurement as FRA (Frequency Response Analyzer). The measurement was started from a high-frequency range with the conditions of an alternating voltage of 5 mV and a frequency range of 1 Hz to 1 MHz.

The ionic conductivity of the material prepared in Example 1 was $2.1 \times 10^{-5}$ S/cm.

X-Ray Diffraction Measurement

Figure 2:
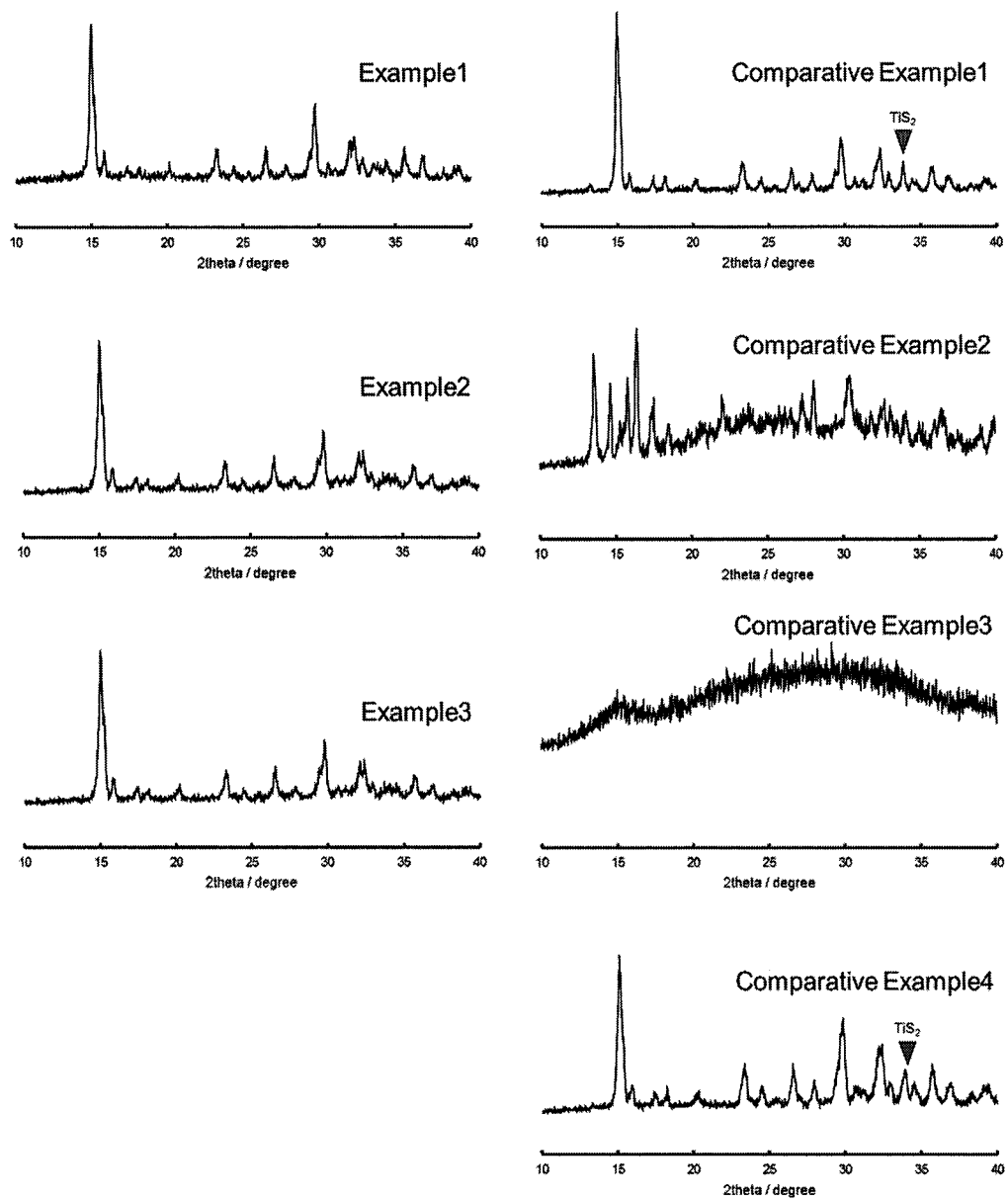
FIG. 2 shows X-ray diffraction patterns (XRD) of lithium titanium thiophosphate LiTi$_2$(PS$_4$)$_3$ samples obtained according to the process of the present invention (embodiments illustrated in a non-limiting manner by Examples 1 to 3) or according to the conventional synthesis process (Comparative Example 1) or according to other processes not according to the present invention (Comparative Examples 2 to 4).

X-ray diffraction measurement (using a CuKα line) was performed by using the sulfide solid electrolyte materials obtained in Examples and in Comparative Examples. The results are shown in FIG. 2.

For samples prepared according to the Examples, essentially only the peaks of $LiTi_2(PS_4)_3$ were detected.

Example 2

Only the heat treatment temperature was different from Example 1—here the heat treatment temperature was 400° C. and the sample was not melted. The ionic conductivity of the material produced by Example 2 was $2.5 \times 10^{-5}$ S/cm. Essentially only the peaks of $LiTi_2(PS_4)_3$ were detected by XRD.

Example 3

Only the heat treatment temperature was different from Example 1—here the heat treatment temperature was 450° C. and the sample was not melted. The ionic conductivity of the material produced by Example 3 was $2.0 \times 10^{-5}$ S/cm. Essentially only the peaks of $LiTi_2(PS_4)_3$ were detected by XRD.

Comparative Example 1=Synthesized Via Literature Process

Unlike Example 1, no amorphasizing step was performed. The heat treatment temperature was 750° C. and the sample was melted. The ionic conductivity of this sample was $0.9 \times 10^{-5}$ S/cm. Peaks of $TiS_2$ were detected by XRD in addition to those attributed to $LiTi_2(PS_4)_3$.

Comparative Example 2

As a difference from Example 1, no amorphasizing step was performed. The heat treatment temperature was 750° C. and the sample was melted. The ionic conductivity of this sample was $0.6 \times 10^{-5}$ S/cm. Peaks of unknown phase were detected by XRD.

Comparative Example 3

As a difference from Example 1, the amorphasizing step was performed but a heat treatment temperature of 300° C. was used, and the sample was not melted. The ionic conductivity of this sample was $0.2 \times 10^{-5}$ S/cm. A halo pattern was detected by XRD, indicating an amorphous product.

Comparative Example 4

As a difference from Example 1, the amorphasizing step was performed but a heat treatment temperature of 500° C. was used, and the sample was not melted. The ionic conductivity of this sample was $1.2 \times 10^{-5}$ S/cm. Peaks of $TiS_2$ were detected in addition to $LiTi_2(PS_4)_3$ by XRD.

Figure 3:
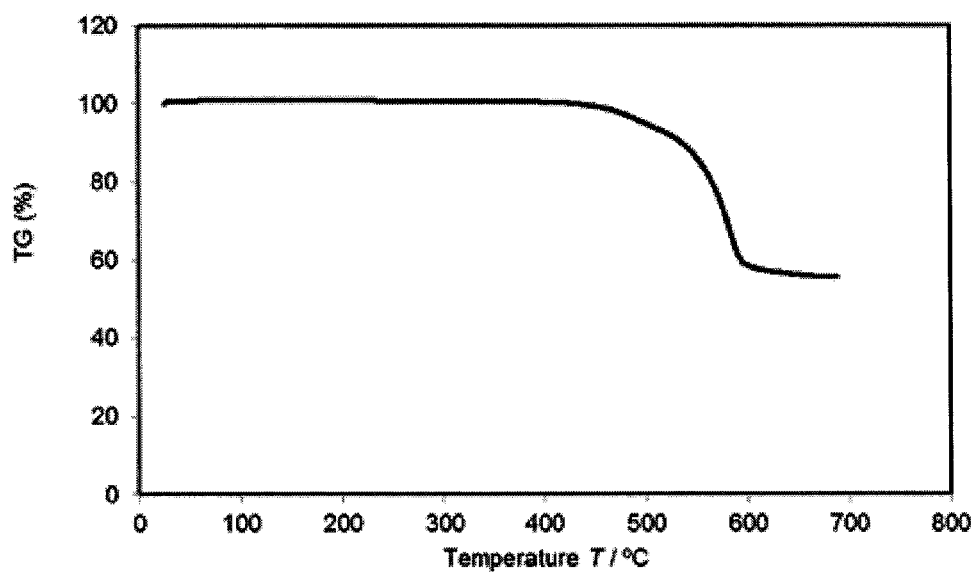
FIG. 3 shows thermogravimetric analysis (TGA) study of high temperature heat treatment of amorphasized LiTi$_2$(PS$_4$)$_3$ (Comparative Example 4).

From the TGA measurement, weight loss was observed at around 400° C. (FIG. 3). This indicates evaporation of the material. Such an evaporation may lead to the decomposition of $LiTi_2(PS_4)_3$ and the generation of $TiS_2$ at 500° C. Here, it is considered that this is not unreacted titanium disulfide but instead (re)generated $TiS_2$, issuing from $LiTi_2(PS_4)_3$ already produced. It is observed that once the $TiS_2$ is (re)generated during heat treatment, it is very difficult to remove it by heat treatment (a very long time is needed)

Importance of the Amorphasizing Step

From the results Comparative Example 1 and Comparative Example 2 without an amorphasizing step, it is very difficult to avoid the melting of the material due to the low melting point of $P_2S_5$ (~270° C.). $LiTi_2(PS_4)_3$ was obtained at a high temperature heat treatment condition of T=750° C. However, the material obtained included $TiS_2$ as impurity. Possibly as a result of this, its ionic conductivity was low. Even though the low temperature of T=400° C. (same as Example 1) was applied, the material was melted, resulting in an unknown phase and low ionic conductivity. The amorphasizing step allows one to apply a temperature of over 400° C. without melting. Therefore it is possible to synthesize a single phase of $LiTi_2(PS_4)_3$ exhibiting high ionic conductivity.

Temperature Optimization

Figure 4:
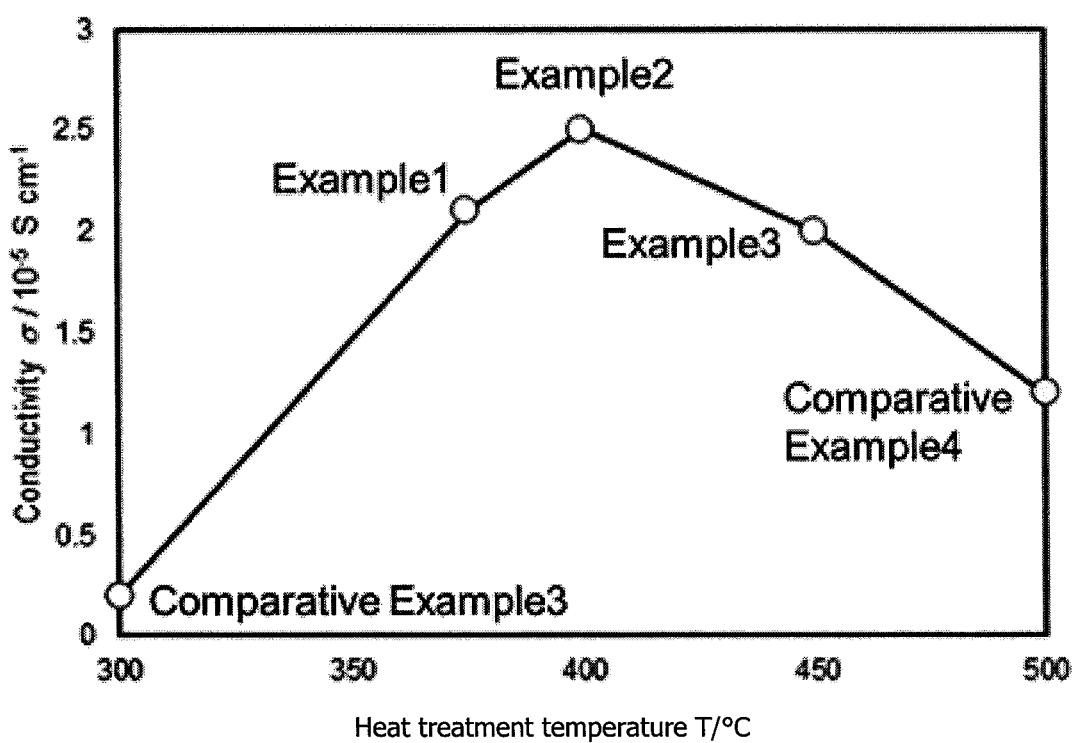
FIG. 4 shows ionic conductivity values observed for lithium titanium thiophosphate LiTi$_2$(PS$_4$)$_3$ samples obtained according to illustrative and non-limiting embodiments of the present invention (Examples 1 to 3), or according to embodiments not according to the present invention (Comparative Examples 3 and 4).

From the results of Example 1&2 and Comparative Examples 3&4, the heat treatment temperature T range of 375° C.≤T<500° C. is preferable to obtain the single phase of $LiTi_2(PS_4)_3$ and high ionic conductivity (FIG. 4). A temperature of 300° C. or lower gives rise to amorphous product and a temperature of 500° C. or higher appears to be correlated with the continued presence of $TiS_2$ and evaporation.

The invention claimed is:

1. A method of synthesis of lithium titanium thiophosphate $LiTi_2(PS_4)_3$ comprising the steps of:
   (a) providing a mixture including lithium sulfide $Li_2S$, phosphorus sulfide $P_2S_5$ and titanium sulfide $TiS_2$;
   (b) subjecting the mixture prepared in step (a) to a preliminary reaction step through melt-quenching to produce an intermediate amorphous sulfide mixture, wherein the melt-quenching includes heating the mixture prepared in step (a) at a heating rate that is in a range of from 0.05° C./min to 20° C./min, and for a holding time that is in a range of from 3 hours to 300 hours;
   (c) subjecting the intermediate amorphous sulfide mixture prepared in step (b) to a heat treatment step at a maximum plateau temperature that is above 400° C. and less than 500° C.

2. The method according to claim 1, wherein in the heat treatment step (c), the maximum plateau temperature is not more than 475° C.

3. The method according to claim 1, wherein in the heat treatment step (c), the maximum plateau temperature during the heat treatment is maintained for at least 1 hour and at most 300 hours.

4. The method according to claim 1, wherein the lithium sulfide $Li_2S$, phosphorus sulfide $P_2S_5$ and titanium sulfide $TiS_2$ starting materials are used in an $Li_2S:P_2S_5:TiS_2$ mole ratio of 1:3:4.

5. The method according to claim 1, wherein the melt-quenching further includes heating the mixture prepared in step (a) to a temperature above 700° C. to melt the mixture, and cooling the heated mixture at a cooling rate of between 300 to 1,000 K/s.

6. The method according to claim 1, wherein the maximum plateau temperature is in a range of from 450° C. to less than 500° C.

* * * * *